(12) United States Patent
Hatch

(10) Patent No.: US 7,202,819 B2
(45) Date of Patent: Apr. 10, 2007

(54) TAPERED MULTIBAND ANTENNA

(75) Inventor: Robert J. Hatch, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 292 days.

(21) Appl. No.: 10/824,953

(22) Filed: Apr. 14, 2004

(65) Prior Publication Data

US 2005/0233786 A1    Oct. 20, 2005

(51) Int. Cl.
*H01Q 1/38* (2006.01)
*H01Q 1/24* (2006.01)

(52) U.S. Cl. .................. 343/700 MS; 343/702

(58) Field of Classification Search ......... 343/700 MS, 343/702, 846, 848, 795, 807, 893
See application file for complete search history.

(56) References Cited

U.S. PATENT DOCUMENTS 5,828,340 A * 10/1998 Johnson ............... 343/700 MS
5,872,546 A *  2/1999 Ihara et al. ................ 343/795
6,419,506 B2 * 7/2002 Jones et al. ............... 439/131

2004/0100406 A1 * 5/2004 Okado ................. 343/700 MS

OTHER PUBLICATIONS

Narayan Prasad Agrawall et al., "Wide-Band Planar Monopole Antennas," *IEEE Transactions on Antennas and Propagation*, vol. 46, No. 2, Feb. 198, pp. 294-295.

* cited by examiner

*Primary Examiner*—Hoanganh Le
(74) *Attorney, Agent, or Firm*—Thomas R. Rouse; Thien T. Nguyen; Sandra L. Godsey

(57) ABSTRACT

Embodiments disclosed herein address the need in the art for a relatively small multi-band antenna. In one aspect, an antenna poise comprises an element, one edge of which is tapered from the connection point of a counterpoise to a second edge of the element. In another aspect, multiple elements are included in the poise, which may include tapered or rectangular poise elements. In yet another aspect, a quarter-ellipse poise is deployed. In yet another aspect, a poise element with an edge formed according to $y=1/(m*x)$ is formed, where m is any number. A poise may be folded, or deposited on a folded substrate. Various other aspects are also presented. These aspects have the benefit of providing desirable frequency response characteristics over a wide frequency range, selectable by design, along with suitability for deployment in a relatively confined space.

26 Claims, 12 Drawing Sheets

TAPERED MULTIBAND ANTENNA

BACKGROUND

1. Field

The present invention relates generally to wireless communications, and more specifically to a tapered multiband antenna.

2. Background

Wireless communication systems are widely deployed to provide various types of communication such as voice and data. A typical wireless data system, or network, provides multiple users access to one or more shared resources. A system may use a variety of multiple access techniques such as Frequency Division Multiplexing (FDM), Time Division Multiplexing (TDM), Code Division Multiplexing (CDM), and others.

Example wireless networks include cellular-based data systems. The following are several such examples: (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) the high data rate (HDR) system that conforms to the TIA/EIA/IS-856 standard (the IS-856 standard). Example non-cellular wireless networks include the various IEEE 802.11 standards.

Wireless Wide Area Networks (WANs) are deployed throughout the world using various frequencies and communication technologies. Laptop manufacturers, as well as other user terminal manufacturers, would benefit from a low-cost universal antenna integrated within the laptop or user terminal that can function on the many different wireless WANs deployed anywhere in the world. There are several WAN frequency bands that range from 824 MHz to 2500 MHz. The advantage of a low-cost integrated universal antenna is that it may be installed in a laptop and shipped anywhere in the world, reducing mass production volume costs and avoiding the need for differentiated product lines for units going to different locations. Consumers may also appreciate an integrated antenna as they could avoid purchasing a separate device, such as a PCMCIA card or other device to use as a wireless WAN modem. Such a customer may also avoid worrying about lost or misplaced devices. A universal antenna would allow the customer to travel anywhere in the world and access wireless Wide Area Networks in those locations.

In current implementations, integrated antennas for user terminals, such as laptop computers, are not adaptable for use within the multiple frequency ranges deployed throughout the world. Universal access modems currently available require an external PCMCIA card, with an external antenna attached. The antenna extends approximately one inch from the outside case of the laptop. Although the antenna allows for access over a wide range of frequency bands, there are several problems. The customer has to purchase the PCMCIA card separately. The PCMCIA card could get lost or misplaced. And, since the antenna extends outside the laptop case, it is prone to damage. Currently available multi-frequency band antennas are too large to fit within a mobile user terminal of small size, such as a notebook computer.

There is therefore a need in the art for a small size multiband antenna that lends itself well to integration within a relatively confined space.

DETAILED DESCRIPTION

Figure 1:
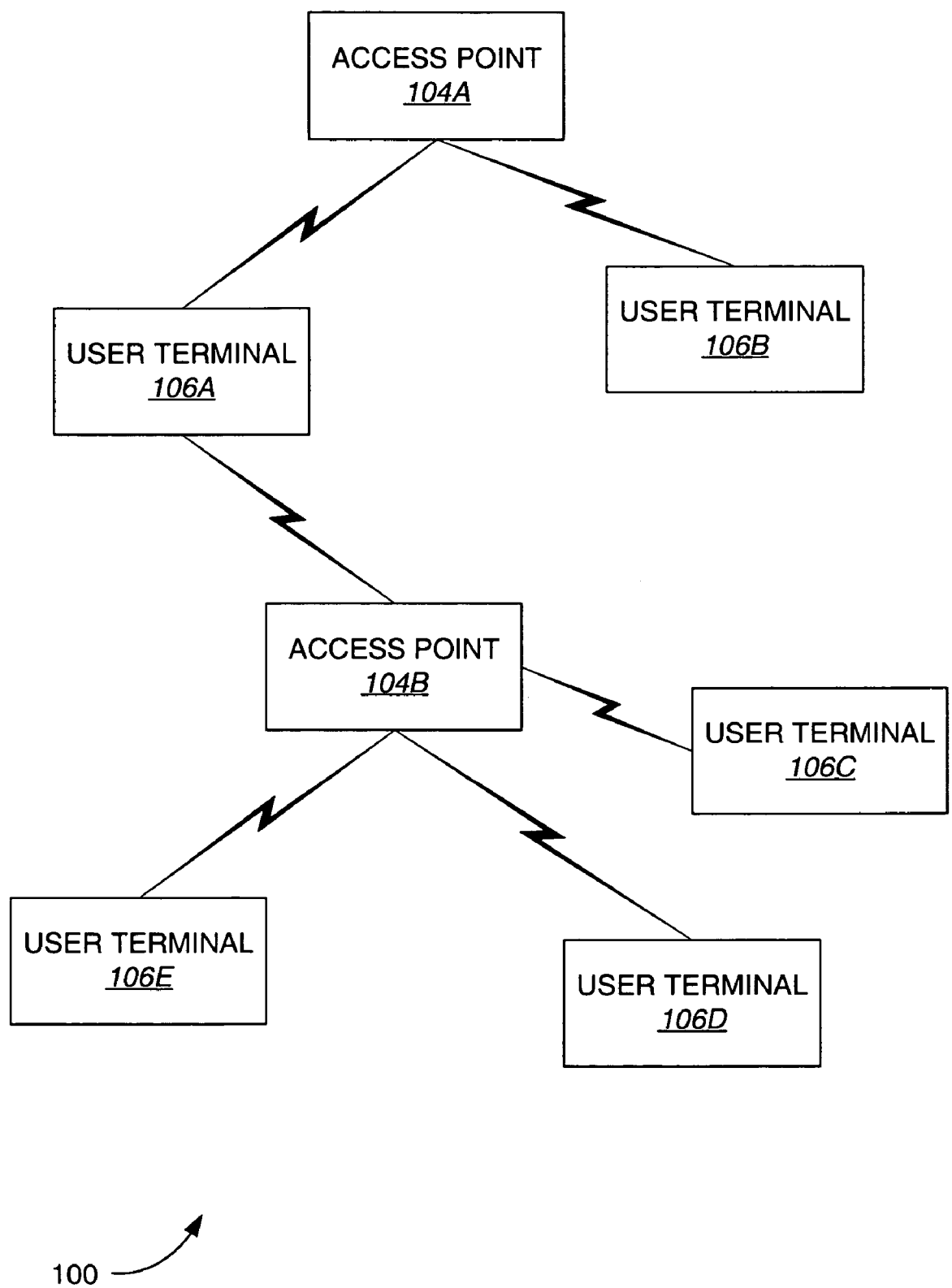
FIG. 1 is a general block diagram of a wireless communication system capable of supporting a number of users.

FIG. 1 depicts an example communication system 100, comprising one or more access points 104 and one or more user terminals 106. In this example, access point 104A is shown communicating with user terminals 106A and 106B. Access point 104B is shown communicating with terminals 106A and 106C–E. In an example embodiment, the user terminals 106 communicate with access points 104 using one of a variety of wireless communication standards. Examples include wireless LAN standards such as 802.11 (a–n) as well as data communication protocols specified in various cellular communication standards, examples of which are listed above. In a cellular communication network, an access point 104 may be incorporated into a base station. A user terminal may be included within or include a mobile station such as a cellular telephone or wireless modem. As used herein, the term access point can be used interchangeably with the terms access point, Node B, or corresponding terms known in the art. The term user terminal can be used interchangeably with the terms user equipment (UE), subscriber unit, subscriber station, mobile station, remote terminal, or other corresponding terms known in the art. The term user terminal encompasses fixed and mobile wireless applications. An access point or user terminal may be referred to as a wireless communication device.

Wireless system 100 may incorporate one or more wireless communication standards for transmission on one or more frequency bands. It is desirable for each user terminal 106 to include an antenna capable of receiving and transmitting on the variety of frequency bands for various networks deployed throughout the world. Such a universal antenna would be advantageously small enough to be incorporated within the user terminal. External antennas or modems, in addition to increasing the size of the device, may be prone to damage. A removable antenna may require the user to travel with one or more antennas or other devices. An internally integrated universal antenna will support each frequency band supported by the user terminal. The user may not need to purchase an after-market accessory. An integrated antenna may also be less subject to damage and/or loss.

User terminals as well as access points use antennas. Although an integrated, small-size antenna may be more advantageous for a user terminal, such an antenna may also be deployed in an access point 104. In some embodiments, an access point may also be desired to be of relatively small size, and an incorporated universal antenna will yield the advantages listed above as well.

Figure 2:
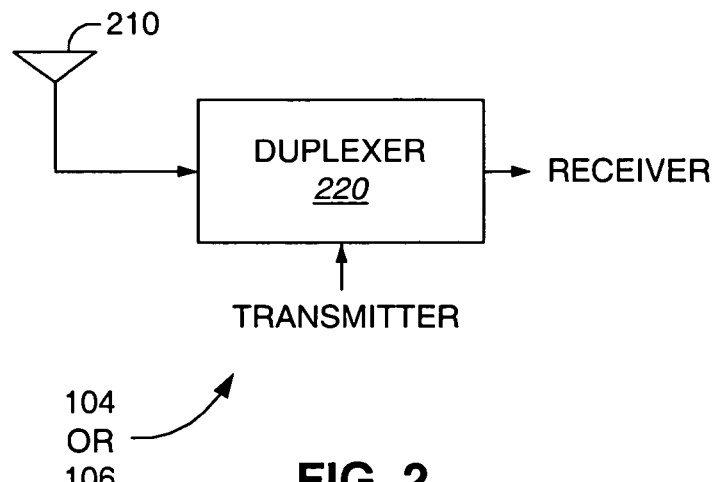
FIG. 2 depicts a portion of an example access point or user terminal.

FIG. 2 depicts a portion of access point 104 or user terminal 106. An antenna 210 is connected to duplexer 220. In an alternate embodiment a diplexer may be substituted for duplexer 220. In yet another alternative, multiple antennas may be deployed. A separate antenna may be deployed for the receiver and the transmitter. Signals received via antenna 210 are delivered to a receiver for further processing. Signals intended for transmission on antenna 210 are received by duplexer 220 from a transmitter. Various receiving and transmitting techniques are well known in the art (not depicted in FIG. 2). An example receiver may perform various processing, such as radio frequency (RF) to baseband conversion, amplification, analog to digital conversion, filtering, and the like. A receiver may perform at various frequencies. A receiver may include other components such as RAKE receivers, equalizers, combiners, deinterleavers, decoders, and various other functions and/or components for processing received signals. These and other various receiving techniques are well known in the art. Signals may be received and processed in accordance with one of a variety of communication standards or specifications.

An example transmitter may include amplifiers, filters, digital to analog converters, radio frequency (RF) converters, and the like. A transmitter may also comprise modulators, spreaders, encoders, interleavers, and other components and/or functions. Data and control channels for transmission may be formatted in accordance with a variety of communication standards.

Figure 3:
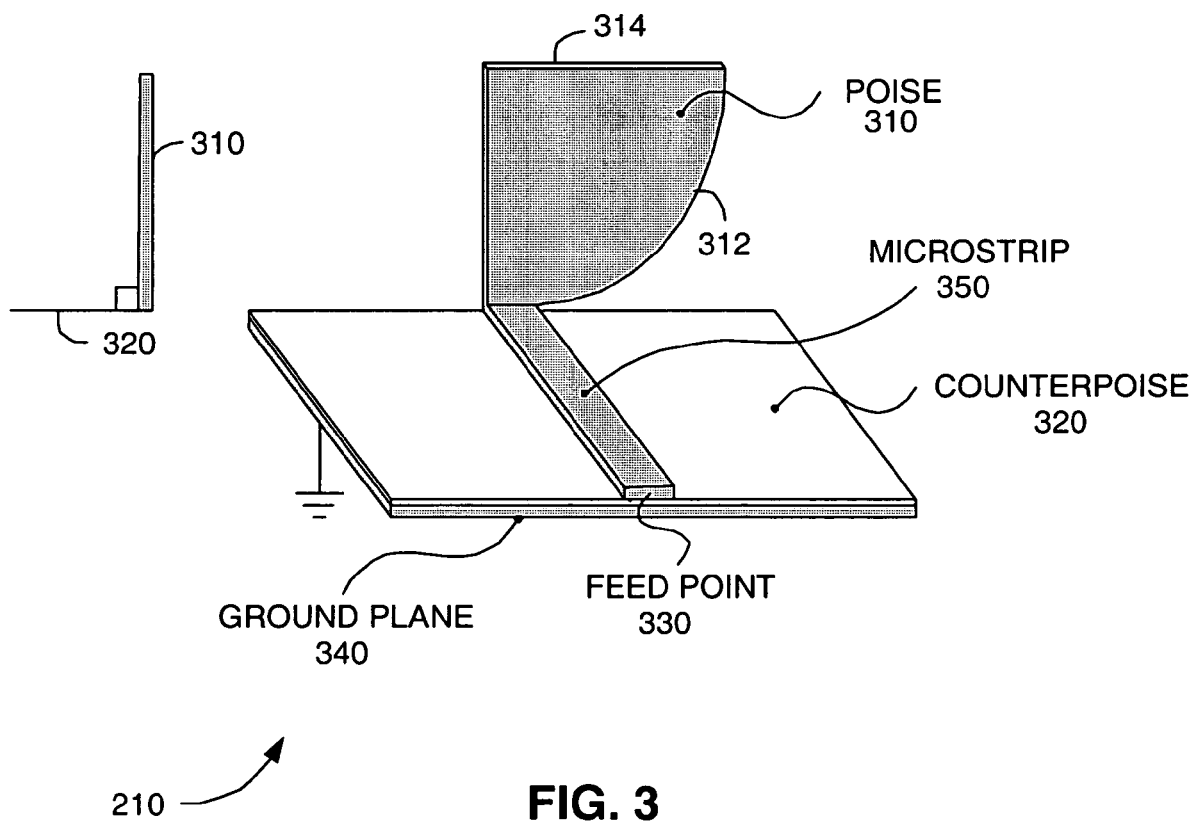
FIG. 3 depicts an example monopole antenna.

FIG. 3 depicts an example of antenna 210. Antenna 210 is an example of a monopole antenna, a technique well known in the art. The signals received and/or transmitted on an RF transmission line are connected to antenna 210 via feed point 330 connecting to microstrip 350. Antenna 210 comprises a poise 310 and a counterpoise 320. In this embodiment, the poise 310 is a quarter ellipse or circle conductor having a tapered edge 312 that extends from the counterpoise 320 to a straight edge 314. By terminating the tapered edge 312 with a straight edge 314, rather than allowing the taper to continue along the circumference of a full ellipse or circle, the size of the antenna may be reduced while maintaining a relatively wide bandwidth. The reduced size antenna may be achieved even if the second edge is slightly tapered.

As shown, poise 310 is perpendicular to counterpoise 320. In alternative embodiments, examples of which are shown below, various portions of poise 310 need not be perpendicular to counterpoise 320, although, generally, poise 310 does not overlap the ground plane portion of counterpoise 320. Poise 310 is connected to feed point 330 via microstrip 350. Microstrip 350 is an above ground RF transmission line providing an easy method of connection between the poise 310 and duplexer 220.

Figure 4:
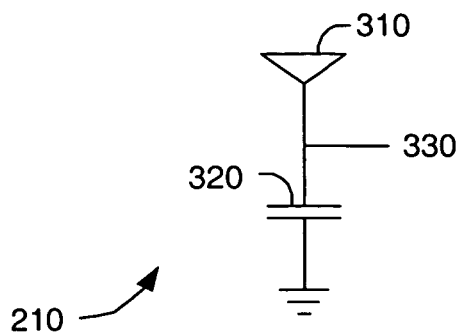
FIG. 4 is a conceptualized diagram illustrating the connection of a feed point to an antenna poise via a counterpoise.

FIG. 4 depicts a conceptualized diagram showing poise 310 receiving the signal from feed point 330, capacitively connected to ground via counterpoise 320. A counterpoise may be described as a ground radiating portion of an antenna. A poise may be described as the non-ground radiating portion of the antenna. The frequency response for various antenna embodiments will be determined in part by the shape and size of poise 310.

Figure 5:
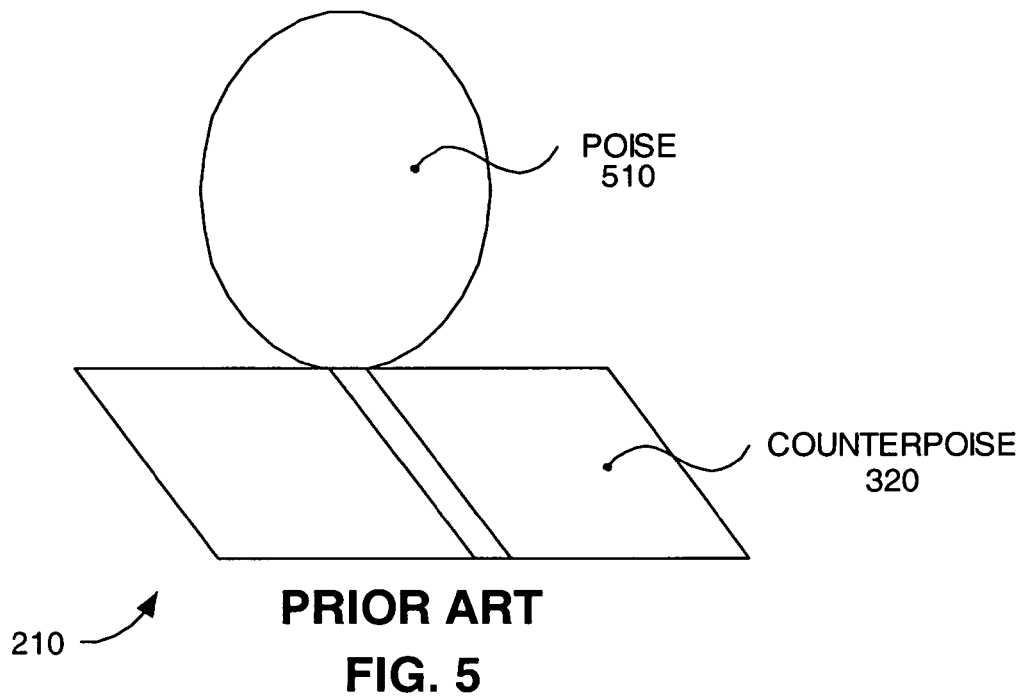
FIG. 5 is a prior art elliptical poise antenna.

A universal antenna suitable for deployment and use within a wide variety of wireless communication networks will need to support the frequency bands deployed by each communication network or standard. FIG. 5 depicts a prior art antenna 210 comprising an elliptical poise 510 connected to a counterpoise 320. A circular or elliptical poise is known in the art and yields wide frequency coverage. For example, a 2.5 to 3 inch by 2.5 to 3 inch elliptical or circular poise is known to give good coverage over a range of 1–10 GHz. Such an antenna is described in Narayan Prasad Agrawall, Girish Kumar, and K. P. Ray's, "Wide-Band Planar Monopole Antennas", IEEE Transactions on Antennas and Propagation, Vol. 46, pp. 294–295, February, 1998. While providing a desirable frequency range, this prior art antenna, including an elliptical or circular poise 510, is not suitable for integration within a small user terminal, such as a laptop computer.

Figure 6:
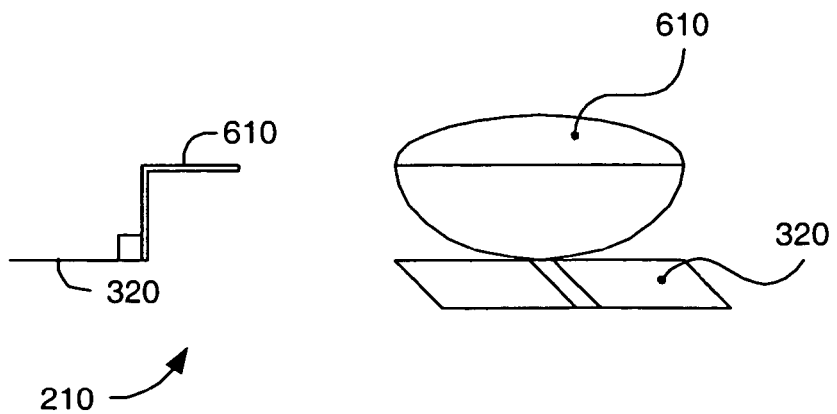
FIG. 6 is a folded elliptical poise antenna.

FIG. 6 depicts a folded elliptical or circular poise 610 connected to a counterpoise 320. As shown the upper half of poise 610 is perpendicular to the lower half of poise 610 but does not overlap the ground plane of counterpoise 320. This folded poise, for an example antenna 3 inch diameter poise, is still 1.5 inches tall, and is not easily integrated within a typical modern laptop computer.

Figure 7:
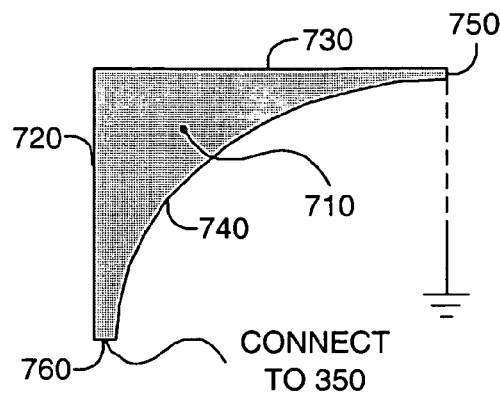
FIG. 7 depicts an example concave poise.

FIG. 7 depicts an example embodiment of a poise 710. It can be seen that poise 710 comprises two straight edges 720 and 730 and a tapered edge 740. Two straight edges are defined as ends 750 and 760, depicted as edges in FIG. 7. In accordance with the principles of the present invention, the taper of edge 740 may be selected to provide desirable frequency response properties. While a circle or ellipse, depicted in FIG. 5, provides a wide frequency range, alternatives, examples of which are described herein, provide for desirable frequency response characteristics while taking up relatively less space. In this example, edge 760 is connected to microstrip 350 on the counterpoise via feed point 330. Edge 740 is tapered according to the curve $y = 1/x$ to achieve wide band frequency operation, beginning at edge 760 and terminating at edge 750, where x and y are coordinates on an x, y axis. Various 1/x curves may be deployed to achieve differing frequency responses characteristics, examples of which are detailed below. Edge 750 may optionally be connected to ground, perhaps connected to ground plane 350. Such short-circuiting to ground broadens the bandwidth by increasing the impedance bandwidth of the antenna. Edges 720, 730 and 750 are straight in this example, but the shape of these edges need not be as such. The shape of edge 740 is one factor that determines the frequency response characteristics of a given poise. Various examples are detailed below.

Figure 8:
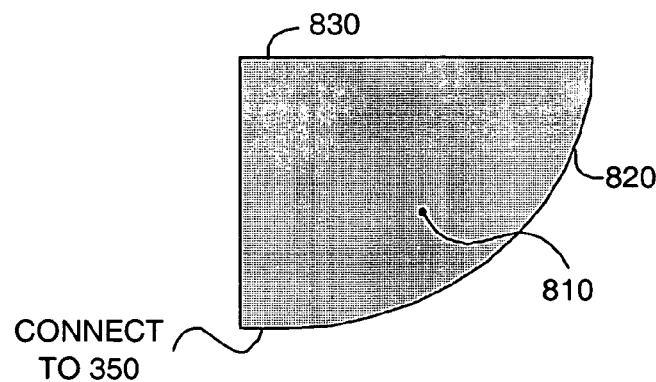
FIG. 8 depicts an example convex poise, a quarter ellipse.

FIG. 8 depicts an alternate poise 810. Poise 810 comprises a quarter of a circle or ellipse. The shape returns some of the high bandwidth response of a full circle or ellipse, with a reduced size appropriate for a user terminal. Edge 820 is shown with a circular or elliptical taper curve and the base of edge 820 is connected to microstrip 350. The circular or elliptical taper extends from the base 820 to an edge 830. The edge 830 is shown as a straight edge, but alternatively, could have a slight taper.

Figure 9:
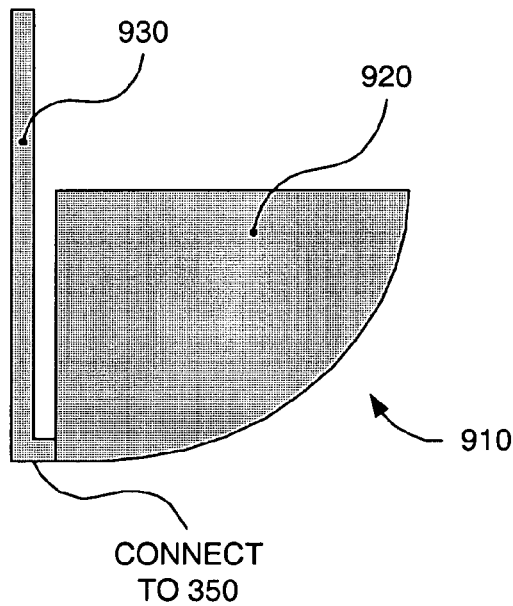
FIG. 9 depicts a multi-element poise comprising a quarter ellipse element and a linear element.

A poise may contain more than one shape to accommodate a desired range of frequencies. FIG. 9 depicts poise 910 comprising elements 920 and 930. Element 920 is a poise component similar to poise 810 depicted in FIG. 8. Element 930 is a linear poise, well-suited to receive a narrow frequency band, as is well known in the art. A "linear poise" means a poise formed with multiple straight edges (i.e. no tapered edges). In an example embodiment, a universal antenna may be desired to support a range of frequency bands. While a circular or elliptical antenna may cover 1–10 GHz, inclusively, the size required may be prohibitive, as described above. Furthermore, such a frequency range may be more than is required for access to commonly deployed networks throughout the world. For example, communication bands in deployment today include approximately 824 MHz to 2170 MHz, and 2400 to 2500 MHz. A quarter ellipse or circle component 910, which is similar to the poise 810 depicted in FIG. 8, can be selected to accommodate the frequency band approximately 1575–2170 MHz. The elliptical or circular taper of component 920 provides better impedance bandwidth over the higher frequency range desired. The linear shape of component 930 is suitable to bring in the lower frequencies (i.e., 824–960 MHz). The two poise components 920 and 930 are connected to microstrip 350 as shown. This specific example is for illustrative purposes. Those of skill in the art will recognize that any combination of poise elements may be included to accommodate the desired range of frequencies for a given antenna design.

Figure 10:
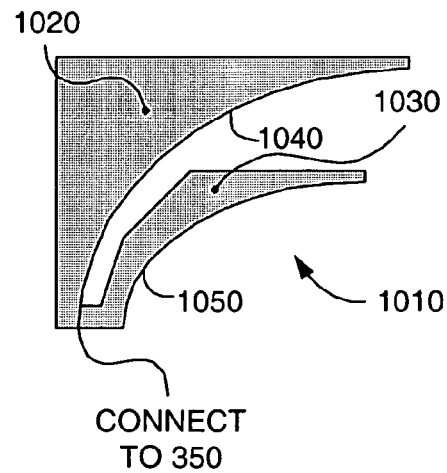
FIG. 10 depicts a multi-element poise comprising two convex, 1/x shaped, elements.

FIG. 10 is an example embodiment of an alternate component poise 1010. Poise 1010 incorporates poise component 1020, which is similar to poise 710 described in FIG. 7, and component 1030, which is also similar to poise 710 depicted in FIG. 7. However, component 1030 does not comprise straight edges such as edge 720 and 730 depicted in FIG. 7. Instead, the edges are cut to accommodate a physical separation between the two components 1020 and 1030. Note that the frequency response is largely determined by the shape of edges 1040 and 1050, thus a notch or cut-away of the opposite sides, as well as the straight edges of the two components, have little or no effect on the frequency response of the antenna. Thus, the straight edges could have a slight taper without substantially affecting the size or bandwidth of the antenna. Note that the curves for generating edges 1040 and 1050 follow a 1/x shape, but need not be identical. Thus, the frequency range covered by component 1030 may be different than the frequency covered by component 1020, and a suitable range of supportive frequencies may be selected by the design of the subcomponents. Additional components of any size or type may also be combined with poise 1010, as will be apparent to those of skill in the art in light of the teachings herein. An example embodiment of a foldable poise 1010, suitable for incorporation with any user terminal, is detailed further below, with various optional modifications identified.

Figure 11:
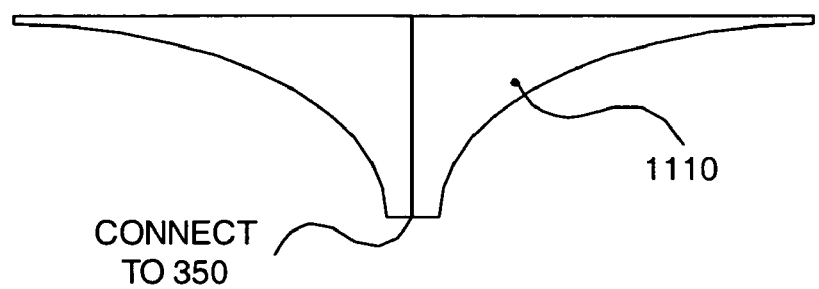
FIG. 11 is a symmetrical poise example formed from a concave element.
Figure 12:
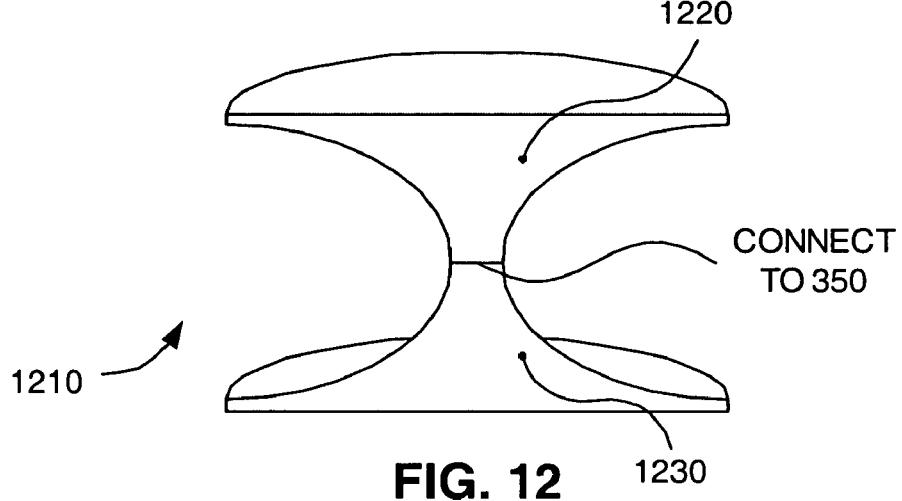
FIG. 12 is an example symmetrical poise comprised of an integration of a poise element over 180 degrees.

The frequency range afforded by a poise, such as poise 710 described in FIG. 7 or poise 810 described in FIG. 8, may be increased by symmetrically duplicating the shape of the poise. FIG. 11 depicts an example of poise 710 which has been replicated and flipped across the vertical axis. Poise 1110 is connected to microstrip 350 at the location shown in FIG. 11. As stated before, the poise 1110 is essentially a two-dimensional shape, other than the thickness of the material used for creating the poise. However, a poise need not be two-dimensional. FIG. 12 depicts poise 1210, which is formed by integrating the volume of poise 710 as it is rotated 180 degrees, to form upper half 1220 as shown. Optionally, upper half 1220 may be mirrored to produce lower half 1230, as well. Poise 1210 is connected to microstrip 350 as shown. Note that, as described above, neither poise 1110 in FIG. 11 nor poise 1210 in FIG. 12 overlaps with the ground plane of counterpoise 320.

Figure 13:
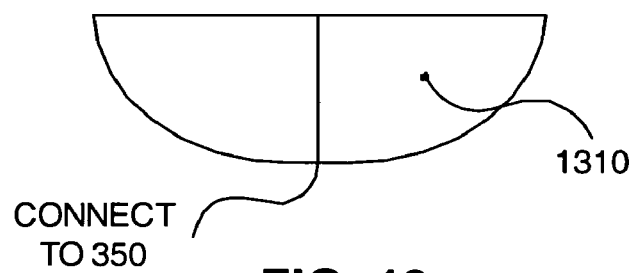
FIG. 13 is an example of a symmetrical poise formed from a convex element.

FIG. 13 depicts an example of a quarter circle or ellipse, such as poise 810 depicted in FIG. 8, symmetrically deployed to form poise 1310. Poise 1310 may be connected to microstrip 350 as shown. A three-dimensional poise, similar in nature to that shown in FIG. 12, may also be created by integrating the rotation of poise 810 through 180 degrees. Those of skill in the art will readily deploy such alternate embodiments in light of the teaching herein.

Figure 14:
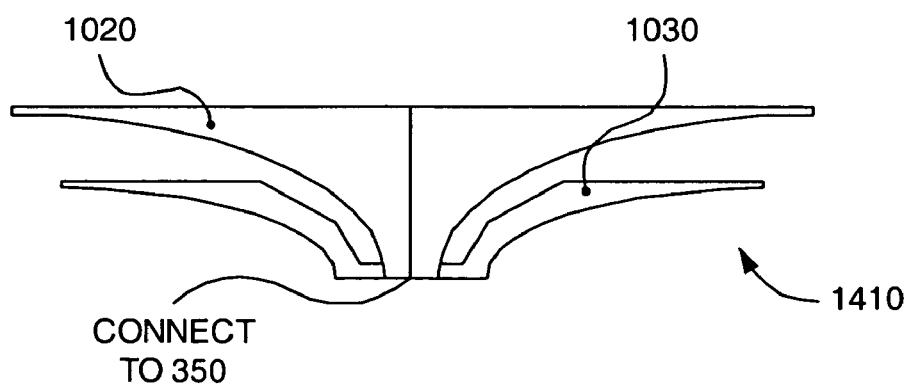
FIG. 14 is an example of a multi-element poise comprised of two symmetrical convex elements, each formed with a unique 1/x shape.

FIG. 14 depicts example poise 1410 comprising two symmetrical edges 1020 and 1030. Each edge 1020 and 1030 comprises two components similar to poise 1010 depicted in FIG. 10. Poise 1410 connects to microstrip 350 as shown. A three-dimensional antenna may also be created using the form of components 1020 and 1030 in similar fashion, as described with respect to FIG. 12.

Figure 15:
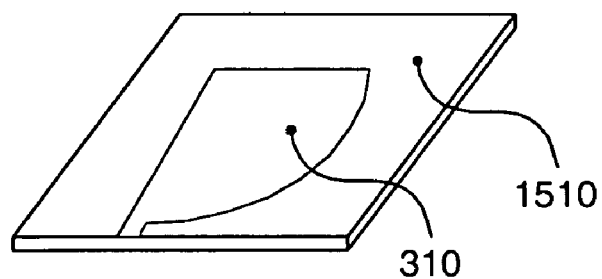
FIG. 15 depicts an example poise deposited on a substrate.
Figure 16:
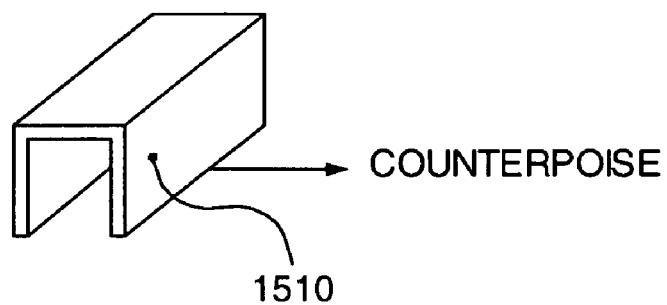
FIG. 16 is an example of a three-quarter rectangular channel substrate.

To create various poises, such as those described above, a variety of techniques may be deployed. For example, a poise may be stamped or cut from a metal sheet using any technique well known in the art. Alternately, a poise may be created by depositing metal on a substrate, using any variety of depositing techniques, also well known in the art. FIG. 15 depicts an example poise 310 deposited on a substrate 1510. Note that in FIG. 15, the substrate is flat. In alternate embodiments, particularly suited for incorporating within a height-restricted environment, such as a laptop computer, alternate shapes for substrate 1510 may be deployed. Additionally, one or more surfaces included in a laptop computer or user terminal may be used as a substrate 1510. In FIG. 16, a three-quarter rectangular channel substrate 1510 is deployed as shown. In this example, the poise 310 may be deposited upon any of the outer three surfaces. Note that the base of one outer surface is connected to the counterpoise. The inner surfaces may also be used, in an alternate embodiment. Thus, poise 310, although wrapped around substrate 1510, does not overlap the counterpoise. Generally, it is desirable also, when forming a poise that components of the poise do not overlap, as they may interfere with each other. The example depicted in FIG. 16 is suitable for such purposes, as the elements of a poise deposited on substrate 1510 do not overlap from the point of view perpendicular to the counterpoise.

Figure 17:
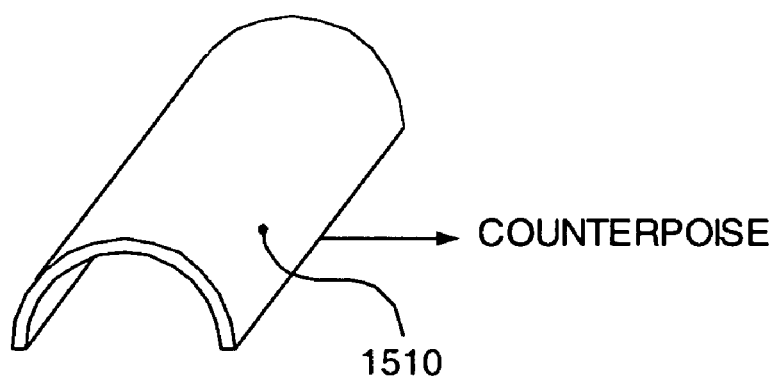
FIG. 17 is an example of half cylinder substrate.

FIG. 17 depicts an alternate shape for substrate 1510, shown to have a half cylinder shape. Various other shapes for substrates will be readily apparent to those of skill in the art. For example, triangular substrates, spherical substrates, semispherical substrates, and the like may be deployed.

Figure 18:
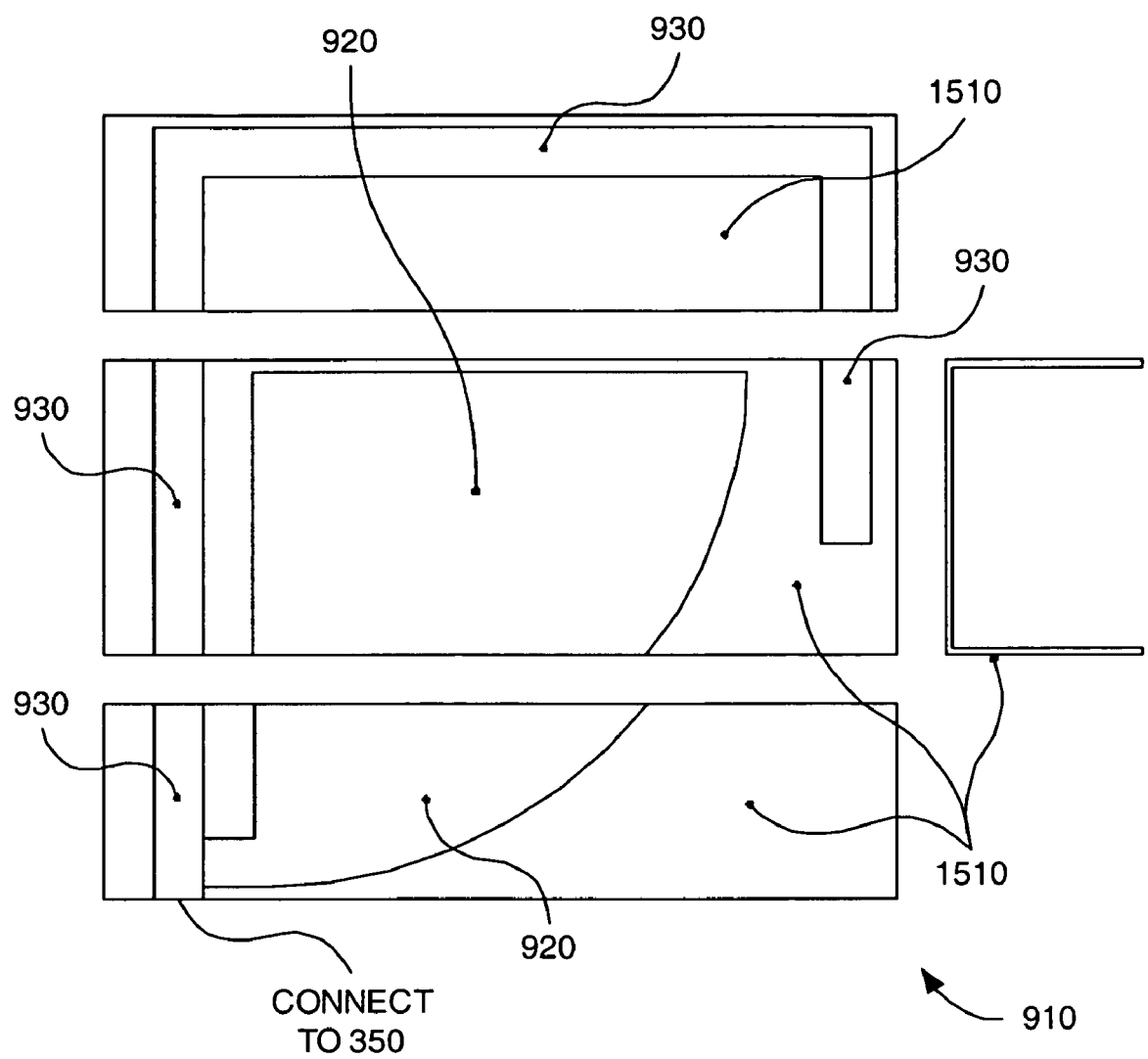
FIG. 18 shows a plan view of a multiple element poise deposited on a substrate.

FIG. 18 depicts various planned views of poise 910. In this example, poise 910 may be created by depositing metal upon substrate 1510, as described above. In an alternate embodiment, the components 920 and 930 depicted may be shaped using a rigid metal and may be attached to a substrate, or not. In this example, substrate 1510 will take the three-quarter rectangular channel shape depicted in FIG. 16. Component 930 will be deposited on three sides, as shown, and is bent. Although component 930 may be a linear shape, the linear shape may be wrapped on the substrate as required. In this example, component 930 is wrapped across the three faces of substrate 1510 as shown. The quarter ellipse or circle component 920 is deposited on two sides, as shown. The two components can act together and may be connected to microstrip 350, as shown.

Figure 19:
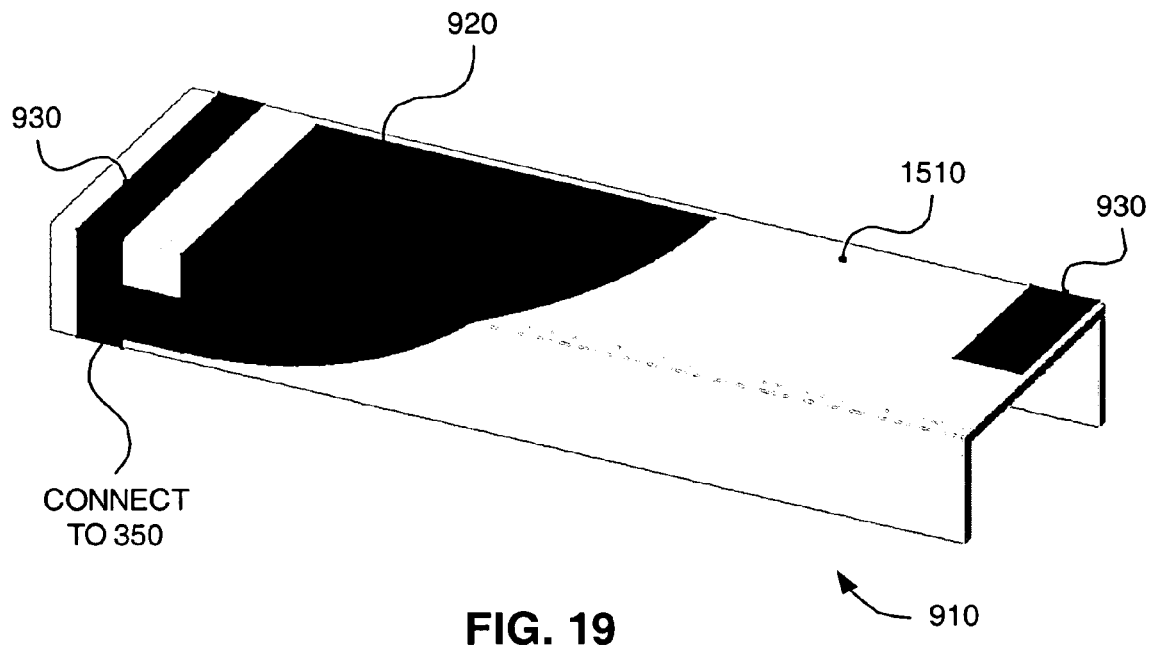
FIGS. 19 and 20 show perspective views of the multiple element poise of FIG. 18.
Figure 20:
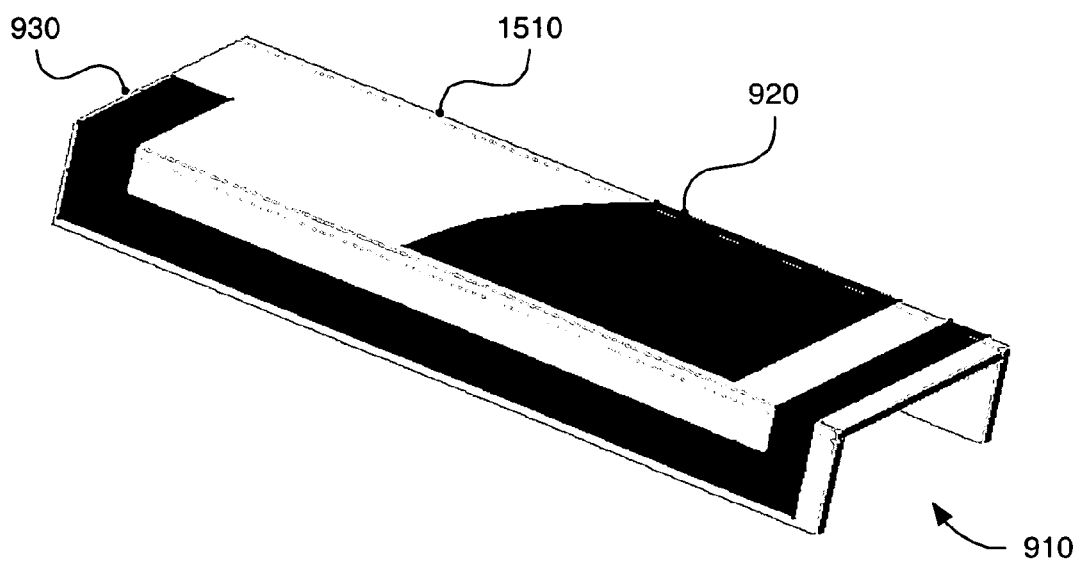

FIGS. 19 and 20 show perspective views of poise 910 when constructed on substrate 1510. FIG. 19 depicts two sides, including the connection point for attaching to microstrip 350. FIG. 20 shows the alternate side, including the wrapping of component 930 to reach the desired length for transmitting and receiving according to the required frequency.

The example embodiment depicted in FIGS. 19 and 20 may be deposited on a substrate 1510 using various materials. In an example embodiment, syndiotactic polystyrene with 0.040 inch wall thickness may be used. The metal may be deposited through vacuum metallization methods, electroless plating methods, or any other method providing sufficient metal adhesion for the environmental conditions of the intended usage of the product. The corrosion and oxidation properties of the chosen metal should also be appropriate for the environmental exposure of the part. Protective coating(s) to prevent oxidation or corrosion may be used as required. Those skilled in the art will be able to make the appropriate choices of substrate, metal, and protective coating.

Figure 21:
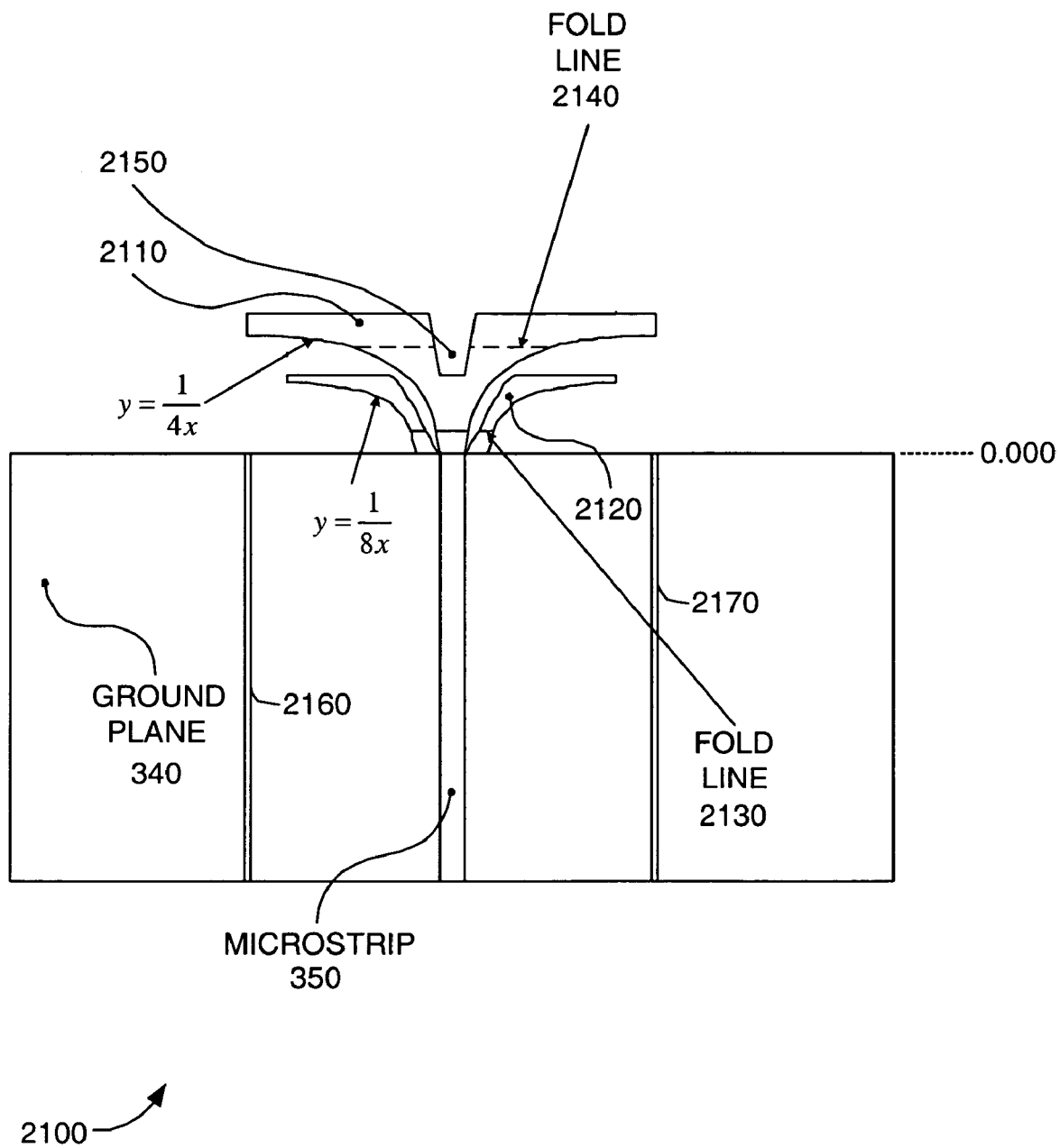
FIG. 21 shows an example multi-element foldable, tapered multiband antenna.

FIG. 21 depicts antenna 2100 which is suitable for cutting or stamping from flat metal and folding into a desirable shape for incorporating with any user terminal. Various components of antenna 2100 may be created separately and attached with any counterpoise or ground plane, in an alternate embodiment. In this example, the poise is comprised of poise elements 2110 and 2120, which have similar shape to poise elements 1020 and 1030 depicted in FIG. 10. Note that, as shown, the shape of the curve for element 2110 is given as $y=1/(4x)$. The shape of the curve for element 2120 is given as $y=1/(8x)$. Each element comprised two symmetrical branches. The upper two branches cover the 824 to 960 MHz bands. The two lower branches cover the 1575 to 2500 MHz frequency bands.

The monopole is folded so that it fits within the height constraint of the user terminal. The folding is depicted as shown with fold line 2130 and fold line 2140. The monopole is connected to microstrip 350 as shown. Two bands 2160 and 2170 are shown connected to ground plane 340 for attachment of a short circuit, as described above with respect to FIG. 7 for optimal attachment to poise element 2110 from either side. This is optional and generally not required. Either side or both poise elements 2110 or 2120 may be attached to the ground plane from their ends. In this example, a single short circuit from one end of poise element 2110 was found to be sufficient to achieve the properties desired.

Note that notch 2150 has been identified in poise component 2110. This notch is optional. Removing metal from this portion of a poise element does not significantly deteriorate the performance, as the bulk of the current flow across frequencies occurs nearer to the edge as determined by the 1/x type shape. Similarly, poise component 2120 is shaped to provide suitable distance between the two poise elements, and the shape of the sides other than 1/x type shape may be selected to suit the physical environment.

It should be noted that the features of the various poise elements disclosed herein yield benefits associated with the taper of the poise element. Approximations to these tapered shapes will also yield these advantages as well. As the approximation approaches the true shape, the full advantages will be available. However, those of skill in the art will readily deploy various approximations to the tapers involved. For example, two or more linear edges may be combined to form the 1/x shape depicted. Two or more linear edges may be combined to form approximations to the elliptical or circular shapes described above. The tapered shapes and approximations thereof fall within the scope of the present invention.

Figure 22:
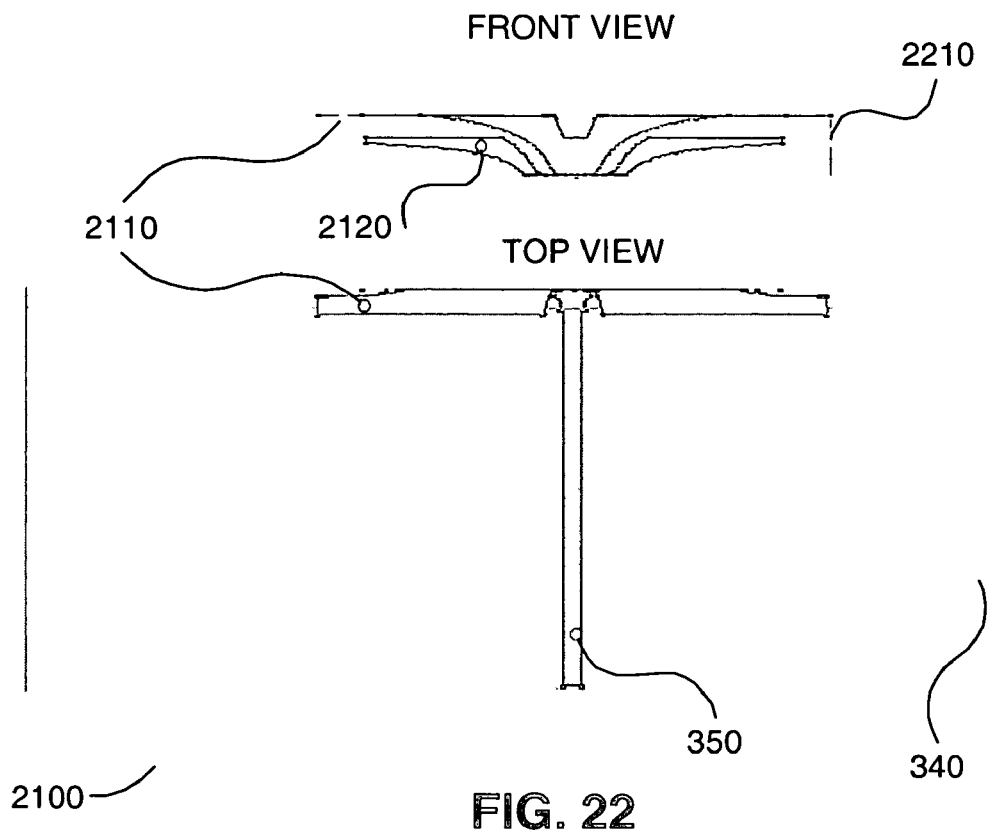
FIG. 22 shows plan views of the antenna of FIG. 21, after folding.

FIG. 22 depicts plan views of antenna 2100, subsequent to folding of the monopole according to fold lines 2130 and 2140, as described above. From the front view, note connection 2210 connecting poise element 2110 to ground plane 340. This connection 2210 is optional, as described above. Note that poise component 2110 is folded both on the top and bottom. In this example, component 2120 is only folded along fold line 2130. Note that all or nearly all of the poise elements are non-overlapping with ground plane 340. Fold line 2130 may be adapted as necessary to achieve this result.

Figure 23:
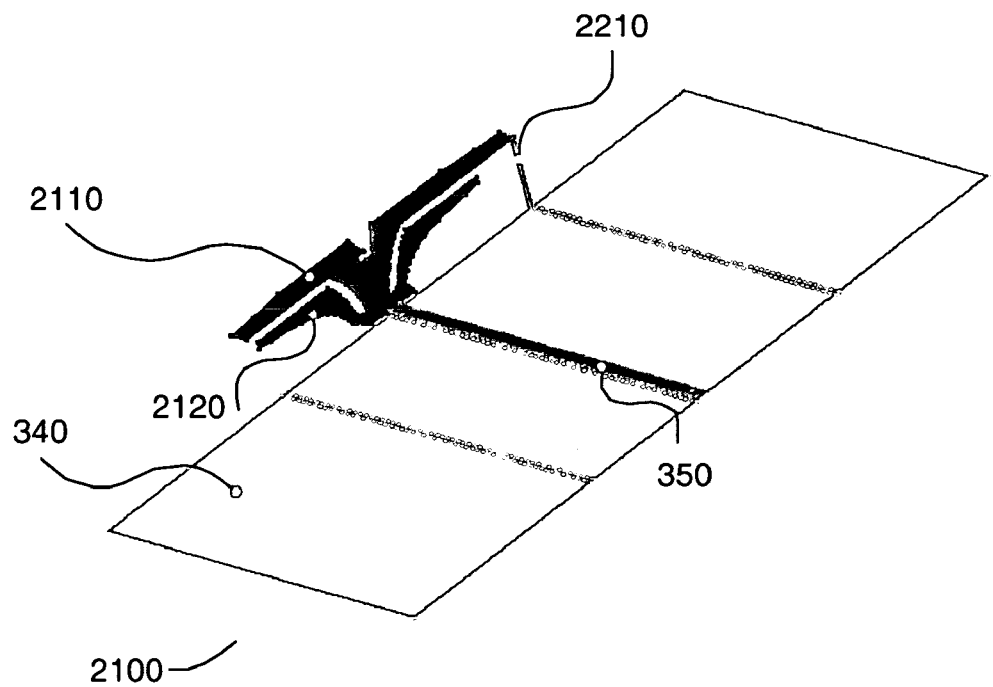
FIG. 23 shows a perspective view of the antenna of FIG. 21.

FIG. 23 shows a perspective view of antenna 2100. Again, note connection 2210 from poise element 2110 to ground plane 340. From this view it can also be seen how poise elements 2110 and 2120 are folded in a "C" shape, as would be seen from a side view. Similar to the example poise 910 depicted in FIGS. 18–20 the folded, tapered, multiband monopole antenna 2100, depicted in FIGS. 21–23, achieves the desired wide frequency range while being small enough to suitably incorporate within a laptop or other user terminal case.

In one embodiment, antenna 2100 may be stamped and folded from a sheet to form antenna 2100. In an alternate embodiment, the various components of antenna 2100 may be formed by depositing metal on the inside plastic case inside of a laptop computer, or other user terminal, using the case or other portion of the user terminal, as a substrate.

The various frequency ranges supported by the shapes described above are determined in accordance with the tapered shape, using either a circular, elliptical, or 1/x tapering. The tapering may be concave, as shown in FIG. 7, and similar figures, or convex, as in the elliptical or circular shape shown in FIG. 8 and similar figures. The shapes may be formed from metal to be free-standing, or deposited on a substrate. Various shapes may be combined to form monopoles comprising multiple poise components to yield desirable frequency response with ranges corresponding to the respective poise components. These and other modifications, including incorporation with user terminals, such as laptop computers, mobile telephones, etc., will be readily apparent to those of ordinary skill in the art in light of the teaching herein.

Figure 24:
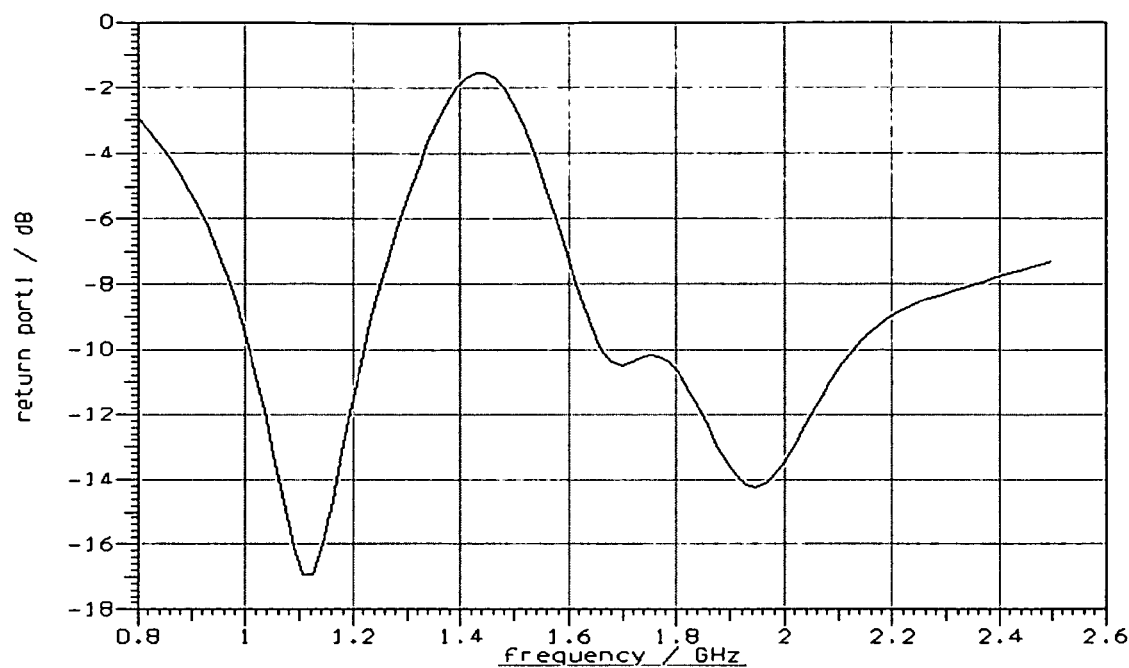
FIG. 24 shows a return loss plot and a Smith chart of the performance of an example antenna as shown in FIG. 23.
Figure 24:
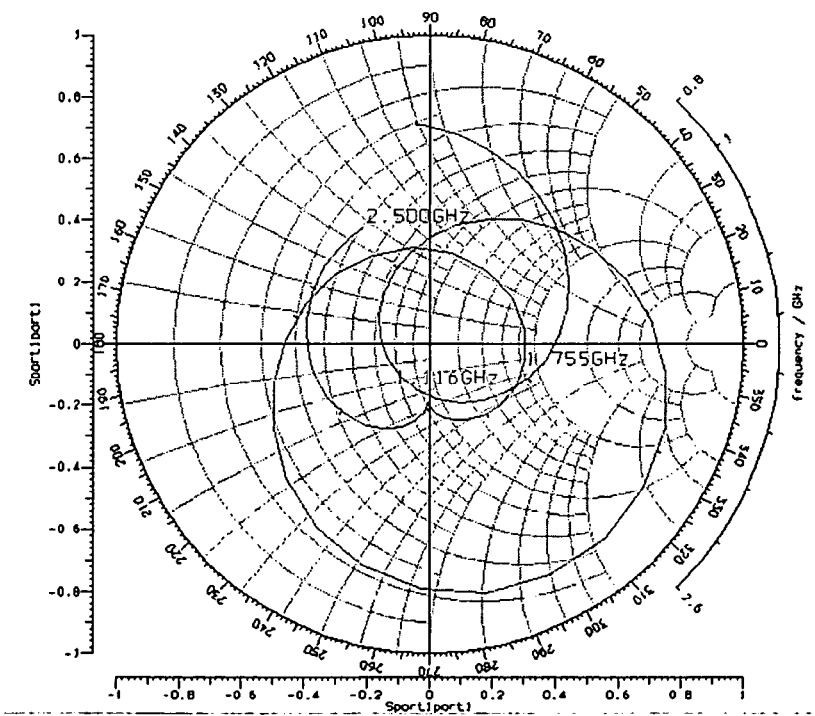

FIG. 24 depicts antenna performance for an example embodiment of antenna 2100. A Smith chart plot of complex impedance is included along with a return loss plot for various frequencies over the desired range of frequencies.

Note that, in an example embodiment, it is desired to have a −6 dB return loss over the specified range of frequencies. As shown in FIG. 24, most of the range shows a return loss of less than −6 db except for frequencies lower than approximately 900 MHz and between approximately 1100 and 1500 MHz. This performance is suitable for the example requirements when covering a variety of wireless data communication standards deployed worldwide, examples of which have been described above.

The return loss and Smith chart plots in FIG. 24 are shown for the "open air" case as shown in FIG. 23 (without any plastic case loading). When an antenna as shown in FIG. 23 is installed in a laptop computer, for example, the stamped metal sheet may be attached to the plastic frame of the laptop for stability. The plastic frame loads the antenna, which may lower the frequency response to some degree such that the frequencies down to 824 MHz would be covered.

Figure 25:
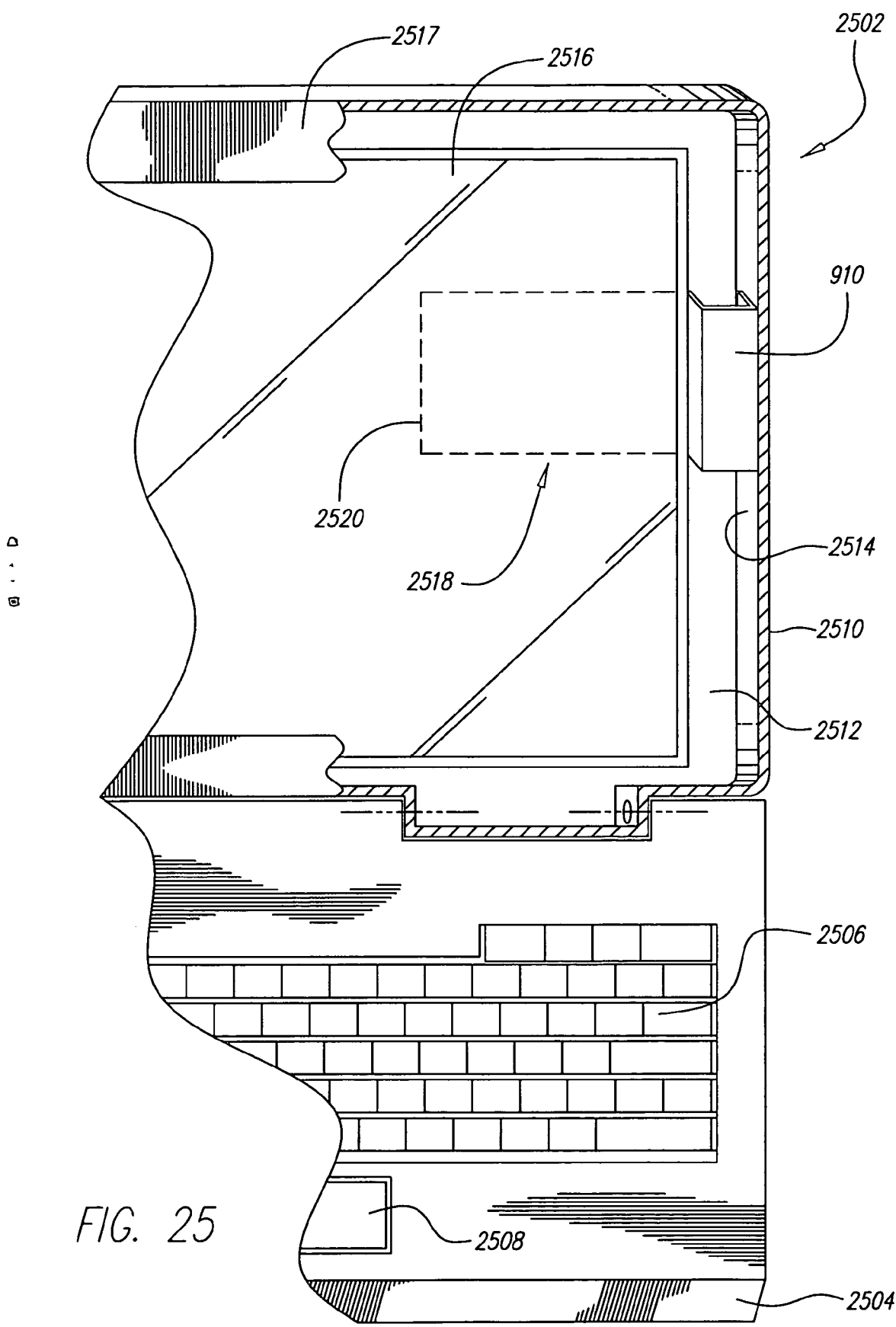
FIG. 25 shows a fragmented perspective view of a laptop with an integrated antenna.

FIG. 25 is a fragmented perspective view of a laptop computer with an integrated antenna. The laptop computer 2502 may include a base 2504 supporting various internal components such as the microprocessor, operating system, memory, disk drives, batteries, and the like. A keyboard 2506 and touchpad 2508 may also be supported by the base 2504 in a way that provides a user interface to the various internal components.

The laptop computer 2502 may also include a lid 2510 hinged to the base 2504. The lid 2510 may include a relatively flat panel 2512 with a peripheral wall 2514 extending around the panel exterior, which is typically about 0.3 inches high or less. The panel 2512 may be used to support a display, such as a 12 to 15 inch Liquid Crystal Display (LCD) 2516, or any other suitable display. A LCD frame 2517 extending around the periphery of the LCD 2516 may be attached to the lid 2510 over the space between the LCD 2516 and the peripheral wall 2514. This space is generally 0.625 inches wide or less.

In at least one embodiment, an antenna 2518 may be integrated into the lid 2510 of the laptop computer 2502. The antenna 2518 may include a poise 910 and a counterpoise 2520. In this embodiment, the poise 910 may be formed with two conductors 920 and 930 deposited on a substrate 1510, similar to that shown in FIG. 18. The first conductor 920 may be a quarter ellipse or circle to cover a bandwidth from 1575 MHz to 2170 MHz, and the second component 930 may be a linear element to cover a bandwidth from 824 MHz to 960 MHz. The substrate 1510 may be folded into a three-quarter rectangular channel to fit neatly into the laptop computer 2502. In alternative embodiments, other poise shapes may be used with or without a substrate.

The counterpoise 2502 may be mounted to the panel 2512 under the LCD 2516 as shown by dashed lines in FIG. 25. Extending from the counterpoise 2520 into the space between the LCD 2516 and the peripheral wall 2514 is the poise 910. The width of the poise 910 may be limited by this space, which in this case, is 0.625 inches. The height of the poise 910 may be limited by the height peripheral wall 2514, which in this case, is 0.3 inches. With regard to the length, greater tolerances may exist. In at least one embodiment of the poise 910, the length may be limited to 2 inches to avoid having to make structural changes to lid.

It should be noted that in all the embodiments described above, method steps can be interchanged without departing from the scope of the invention. Those of skill in the art will readily apply the principles herein to various communication systems. These and other modifications will be apparent to those of ordinary skill in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless communication device comprising:
a monopole antenna, wherein the monopole antenna further comprises:
   a counterpoise;
   a poise comprising:
      a conductor having first and second edges, the first edge having a first taper extending from the counterpoise to the second edge, and the second edge having a straight edge or a second taper different from the first taper; and
      a substrate, the conductor being deposited on the substrate, wherein the substrate with the conductor deposited thereon is folded; and a transmission line connected to the poise.

2. The wireless communication device of claim 1, wherein the first tapered edge is convex.

3. The wireless communication device of claim 1, wherein the first tapered edge is concave.

4. The wireless communication device of claim 1, wherein the conductor comprises a quarter ellipse.

5. The wireless communication device of claim 4, wherein the quarter ellipse comprises a quarter circle.

6. The wireless communication device of claim 1, wherein the first tapered edge has a taper defined by $y =1/(m*x)$, where m is any number, and x and y are coordinates on an x, y axis.

7. The wireless communication device of claim 6, wherein $m =1, 4$ or $8$.

8. The wireless communication device of claim 1, wherein the poise is folded.

9. The wireless communication device of claim 1, wherein the substrate with the conductor deposited thereon is folded into a ¾ rectangular channel.

10. The wireless communication device of claim 1, wherein the substrate with the conductor deposited thereon comprises a half cylinder.

11. A wireless communication device comprising:
a monopole antenna, wherein the monopole antenna further comprises:
   a counterpoise;
   a poise comprising first and second conductors, the first conductor having first and second edges, the first edge having a first taper extending from the counterpoise to the second edge, and the second edge having a straight edge or a second taper different from the first taper, the poise further comprising a substrate, the first and second conductors being deposited on the substrate, and wherein the substrate with the first and second conductors deposited thereon is folded into a ¾ rectangular channel; and
   a transmission line connected to at least one of the first and second conductors.

12. The wireless communication device of claim 11, wherein the poise is folded.

13. The wireless communication device of claim 11, wherein the second conductor is linear.

14. The wireless communication device of claim 13, wherein the first conductor comprises a quarter ellipse.

15. The wireless communication device of claim 11, wherein the second conductor comprises a first and second edge, the first edge of the second conductor having a first taper extending from the counterpoise to the second edge of the second conductor, and the second edge of the second conductor having a straight edge or a second taper different from the first taper of the second conductor.

16. The wireless communication device of claim 15, wherein the first tapered edge of the first and second conductors each has a taper defined by the $y=1/(m*x)$, where m is any number, and x and y are coordinates on an x, y axis.

17. The wireless communication device of claim 16, wherein $m=4$ for the first tapered edge of the first conductor, and $m=8$ for the first tapered edge of the second conductor.

18. A wireless communication device comprising:
a monopole antenna, wherein the monopole antenna further comprises:
   a counterpoise; and
   a poise coupled to the counterpoise, the poise having a maximum length of 2 inches, a maximum width of 0.625 inches and a maximum height of 0.3 inches, the poise further having a first bandwidth that includes a frequency range of 1575–2170 MHz and a second bandwidth that includes a frequency range of 824–960 MHz.

19. The wireless communication device of claim 18, wherein the poise is folded.

20. The wireless communication device of claim 18, wherein the poise comprises a first conductor having the bandwidth that includes the frequency range of 1575–2170 MHz, and a second conductor having the bandwidth that includes the frequency range of 824–960 MHz.

21. The wireless communication device of claim 20, wherein the first conductor comprises a quarter ellipse and the second conductor is linear.

22. The wireless communication device of claim 20, wherein the first conductor includes a first and second edges, the first edge having a first taper extending from the counterpoise to the second edge, and the second edge having a straight edge or a second taper different from the first taper.

23. The wireless communication device of claim 22, wherein the first tapered edge has a taper defined by $y =1/(m*x)$, where m is any number, and x and y are coordinates on an x, y axis.

24. The wireless communication device of claim 20, wherein the poise further comprises a folded substrate having the first and second conductors deposited thereon.

25. The wireless communication device of claim 24, wherein the substrate with the conductor deposited thereon is folded into a three-quarter rectangular channel.

26. The wireless communication device of claim 20, wherein each of the first and second conductors have first and second edges, the first edge for each of the first and second conductors having a first taper extending from the counterpoise to its respective second edge, and the second edge for each of the first and second conductors having a straight edge or a second taper different from the taper of its respective first edge.

* * * * *